(12) United States Patent
Daum et al.

(10) Patent No.: US 7,890,462 B2
(45) Date of Patent: *Feb. 15, 2011

(54) SYSTEM AND METHOD FOR HANDLING PARALLEL UPDATES OF OBJECTS REQUIRING TIME SENSITIVE ACKNOWLEDGEMENT

(75) Inventors: Andreas W. Daum, Heidelberg (DE); Bernd Ernesti, Wiesloch (DE); Renzo Colle, Rastatt (DE); Thomas Griesser, Walldorf (DE); Henrik Saterdag, Leimen (DE); Daniel Zoch, Walldorf (DE); Liwei Lu, Nussloch (DE); Markus J. Kaas, Mannheim (DE); Peter T. Malik, Wolfsburg (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/732,076

(22) Filed: Mar. 25, 2010

(65) Prior Publication Data

US 2010/0179946 A1 Jul. 15, 2010

Related U.S. Application Data

(63) Continuation of application No. 11/297,675, filed on Dec. 7, 2005, now Pat. No. 7,689,561.

(51) Int. Cl.
 *G06F 17/30* (2006.01)
(52) U.S. Cl. ................. 707/620; 707/654; 707/613; 707/614; 707/618

(58) Field of Classification Search ............. None
See application file for complete search history.

(56) References Cited

U.S. PATENT DOCUMENTS

| 5,991,845 | A | 11/1999 | Bohannon et al. |
|---|---|---|---|
| 6,182,186 | B1 | 1/2001 | Daynes |
| 7,139,894 | B1 | 11/2006 | Mensching et al. |
| 7,340,743 | B1 * | 3/2008 | Anural et al. ............. 718/104 |
| 2004/0128269 | A1 | 7/2004 | Milligan et al. |
| 2006/0074977 | A1 | 4/2006 | Kothuri et al. |
| 2008/0181229 | A1 * | 7/2008 | Williams et al. ........... 370/394 |

OTHER PUBLICATIONS

Non-Final Office Action dated Nov. 15, 2007, U.S. Appl. No. 11/297,675, filed Dec. 7, 2005, 10 pgs.
Non-Final Office Action dated May 28, 2008, U.S. Appl. No. 11/297,675, filed Dec. 7, 2005, 10 pgs.
Final Office Action dated Dec. 9, 2008, U.S. Appl. No. 11/297,675, filed Dec. 7, 2005, 12 pgs.

* cited by examiner

*Primary Examiner*—Baoquoc To
(74) *Attorney, Agent, or Firm*—Blakely, Sokoloff, Taylor & Zafman, LLP

(57) ABSTRACT

A system and method of updating persistent objects in a persistent store. In response to receipt of a confirmation of task completion, an attempt is made to acquire a lock for corresponding item data in the persistent store. Regardless of whether the lock is acquired, a successful update of the persistent store is acknowledged to the sender of the confirmation within a defined time period.

8 Claims, 2 Drawing Sheets

SYSTEM AND METHOD FOR HANDLING PARALLEL UPDATES OF OBJECTS REQUIRING TIME SENSITIVE ACKNOWLEDGEMENT

This application is a continuation of pending U.S. patent application Ser. No. 11/297,675, filed Dec. 7, 2005, entitled SYSTEM AND METHOD FOR HANDLING PARALLEL UPDATES OF OBJECTS REQUIRING TIME SENSITIVE ACKNOWLEDGEMENT.

BACKGROUND OF THE INVENTION

1. Field

Embodiments of the invention relate to updating of objects in persistent storage. More specifically, embodiments of the invention relate to insuring data consistency during the parallel update of objects requiring time sensitive response.

2. Background

Integrated information technology (IT) solutions attempt, to the extent possible, to provide real time information for a given business process instance integrated across several business objects and IT components. Business processes are often modeled as objects within the computer system. These objects control the fulfillment of the business process or some part thereof. These objects are used for both visibility and as active process control. In the context of warehouse management, a warehouse request business object (BO) triggers the warehouse execution and controls its fulfillment. For example, warehouse request BO may be a customer order expected to be shipped in the near future. This can then be thought of as a planned delivery.

In many modern warehouse scenarios, warehouse workers do not execute their work directly based on this business object. Instead, tasks associated with multiple business objects may be bundled together for execution. For example, a bundle may be instructions for one worker on a single picking path. As used herein, "task" is a work operation for a single worker. Optimization algorithms may be used to bundle tasks independent of what warehouse request (e.g., customer order) they are associated with. In some cases, the optimization algorithms split items within a warehouse request into multiple tasks that may be assigned to different task bundles. These tasks, and task bundles, are represented in a computer system as additional business objects. This permits users to report/confirm their work using these objects.

For the warehouse request BO to provide visibility and control its fulfillment, data in that BO needs to be updated whenever a task is created or its execution is confirmed. However, because of the task creation and bundling described above, multiple users may confirm task execution for the same warehouse request or even the same item within a warehouse request. In parallel, at substantially the same point in time. This need for substantive simultaneous update can result in lock collision and degrade performance of the system with a corresponding negative impact on efficiency in the warehouse.

SUMMARY OF THE INVENTION

A system and method of updating persistent objects in a persistent store is disclosed. In response to receipt of a confirmation of task competition, an attempt is made to acquire a lock for corresponding item data in the persistent store. Regardless of whether the lock is acquired, a successful update of the persistent store is acknowledged to the sender of the confirmation within a defined time period.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
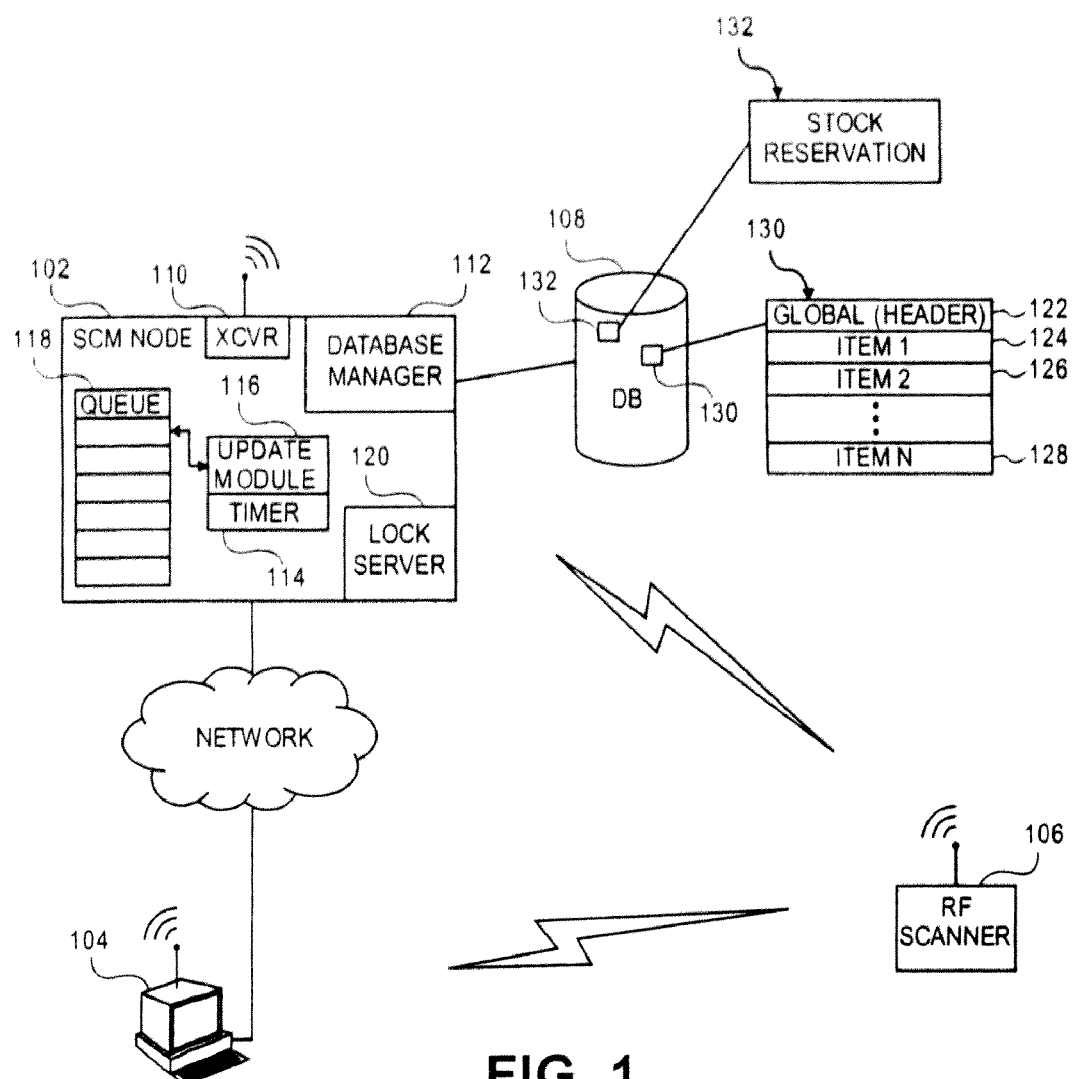
FIG. 1 is a block diagram a system of one embodiment of the invention.

FIG. 1 is a block diagram of a system of one embodiment of the invention. SCM node 102, which is responsible for controlling supply chain management is coupled to a database 108 which persistently stores business objects such as is object 130. Database may additionally include objects corresponding to individual tasks or task bundles. While a database is used in one embodiment, other types of persistent storage may be used in other embodiments. SCM node 102 may be instantiated on one or more physical boxes and may include one or more virtual machines (VM) executing on such physical boxes. A box may contain a single processor system or any of the various multi-processor systems as known in the art. In some embodiments, SCM node 102 and the persistent storage may not be at the same physical location. In such embodiment, SCM node may communicate with persistent storage 108 over a distributed network.

SCM node 102 may include a wireless interface within a transceiver 110 to permit wireless communications with SCM node 102. A database manager 112 manages transactions with database 108. An update module 116 may be used to update objects within the database and may, as further described below, interact with the timer 114 to identify appropriate timing to retry database updates.

A lock server 120 provides database locks to the update module 116 in connection with possible updates of objects within database 108. In one embodiment, the lock server may be an enqueue server available from SAP AG of Walldorf, Germany. The general function of database lock to prevent inconsistent updates is well understood. In some embodiments, synchronization objects, such as semaphores or mutexes may be used in the locking.

Various user input devices may permit users to access the SCM node 102. Input terminal 104 may provide user input using a keyboard or pointer device and may communicate with SCM node by a wired or wireless link. RF (radio frequency) scanner 106 may communicate wirelessly either directly to the SCM node 102 or to the input terminal 104. In some embodiments, input terminal 104 may be a laptop or desktop computer or a work station and may communicate wirelessly or over a distributed network with SCM node 102. In other embodiments, input terminal 104 may be a dumb terminal with a wired link to SCM node 102. RF scanner 106 may be a barcode scanner, or for example, read RF identification (ID) tags. Other types of wireless signalling, such as bluetooth, infrared, etc. may be used in other embodiments of the invention. In some embodiments, when a worker is performing tasks in, e.g. a warehouse, the RF scanner 106 is used to signal a confirmation of task completion (or creation). A completion (or creation) of a task generally results in an update of a central object in database 108. Thus, to update the database object, an update module 116 must acquire a lock for the material to be updated. The confirmation may also cause the creation of additional objects, such as follow on tasks. For example, if the task being confirmed is a picking task, the confirmation may generate a packing task object. Such objects may be necessary for continued efficient operation of the warehouse. Moreover, some time critical information, such as stock reservation, must be handled synchronously with the confirmation to avoid multiple allocations of the same stock.

As noted above, certain synchronous object creations and database updates may be necessitated by business constraints or are otherwise time or logically critical to efficient system operations. These updates to database 108 are performed synchronously when the confirmation is received. For example, stock reservation object 132 may be created synchronously to avoid multiple allocations of picked stock. Other object creations, such as following on task creation, may also be performed. These creations generally do not result in lock collision or lock collision with a meaningful time impact or system response. Conversely, updates to the central object 130 tend to have greater probability of lock collision and when they do, cause significant impact on response time.

In one embodiment of the invention, a data model is employed in the creation of the business objects such the global data 122 in the object is independent of item data 124, 126, 128. In this context, "independent" means that changes to the item data, e.g. 124, has no necessary effect on the global data 122. In this manner, it is possible to increase the granularity of the locking to permit locking on a per item basis. Thus, while a lock on the global data 122 would prevent a subsequent requester from obtaining a lock or any of the items (because changes to the global data my affect the item data) a lock on an item data 122 does not prevent a lock on any other item data, e.g. 126, 128. This reduces the probability of a lock collision over, as has historically been the case, having a single lock for the entire object.

However, lock collisions still can and will occur. Thus, if as previously noted, lock collisions occur, this could result in significant delay before the update is acknowledged and, e.g. a worker using RF scanner 106 can continue with the next task. Accordingly, in one embodiment, if a lock cannot be obtained within a predetermined time, for example, some suitable fraction of a second, the update module 116 will queue the confirmation for the update of central business object 130 in queue 118 and send an acknowledgment signal acknowledging a successful update to the RF scanner 106. Queue embodiments of the invention may use various types of data structures as or instead of queue 118. For example, a FIFO, a linked list, or any other suitable data structure may be used. Queue 118 should ensure that updates for a particular item are processed in the order received at the SCM mode 102. Thus, a physical queue may be associated with each item having pending delayed updates. In one embodiment, a plurality of queues are present and the queues may be allocated to the items as needed. This early acknowledgement permits the worker with the scanner 106 to proceed to the next task unconstrained by delay in the system. Moreover, because the time critical aspects of the database updates occurred synchronously, e.g., stock reservation, the acknowledgement is valid from the perspective of the recipient of the acknowledgement.

Subsequently, lock acquisition will be retried. For example, in one embodiment, relying on timer 114, the update module 116 will retry to acquire appropriate locks for the queued confirmations after waiting a specified delay. In one embodiment, timer 114 permits a configurable amount of time between retries. In some embodiments, the waiting time between retries is a function of the number of retries that have been attempted. In this manner, parallel updates may occur to a central business object 130 without the lock collisions negatively impacting worker performance.

Figure 2:
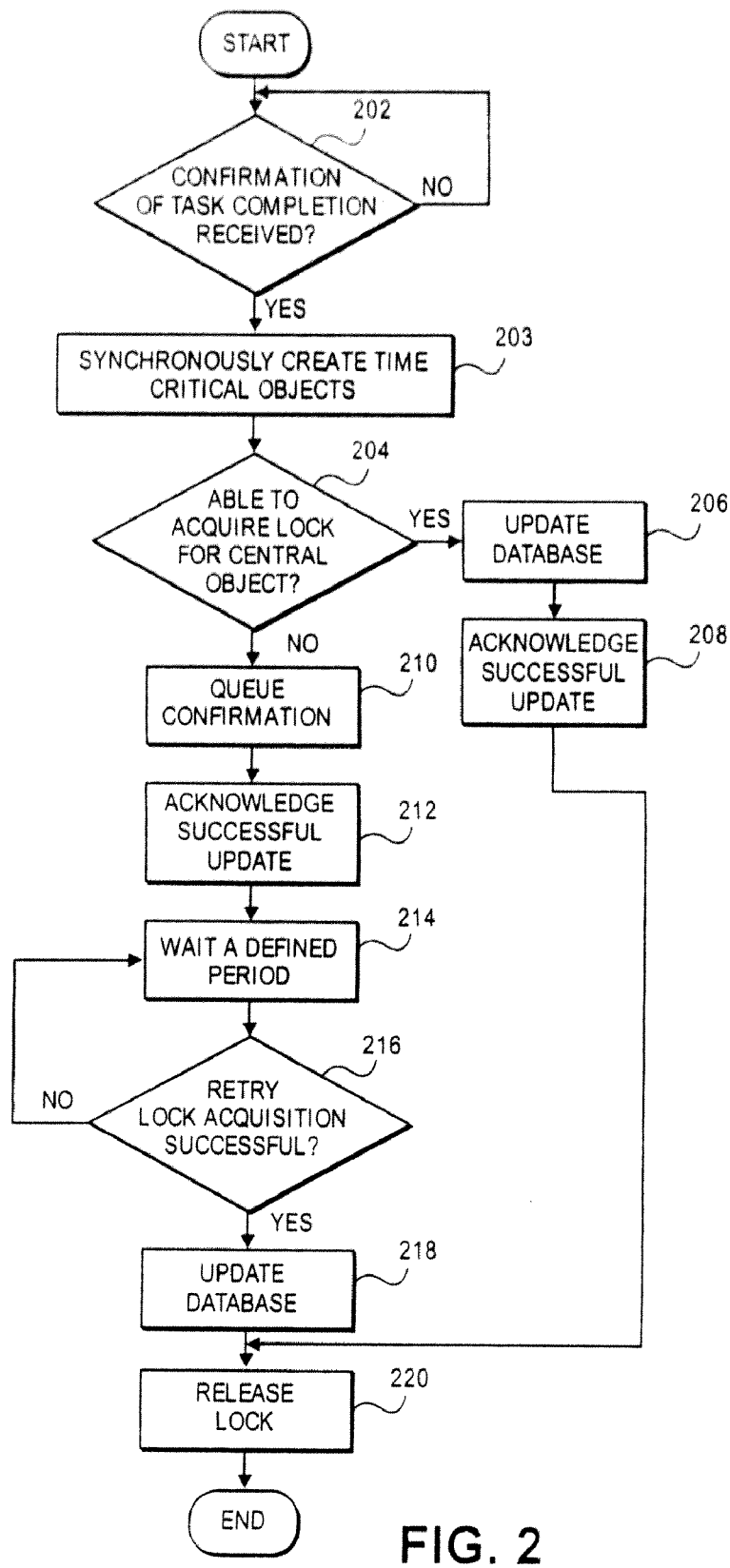
FIG. 2 is a flow diagram of operation system of one embodiment of the invention.

FIG. 2 is a flow diagram of operation system of one embodiment of the invention. At block 202, the determination is made if a confirmation of task completion has been received. If the confirmation is received, at block 202, the system creates any time critical objects and performs all time critical database updates. As previously noted, such time critical updates tend not to suffer from the same risk of lock collision as updates to the central object. At block 204, a determination is made whether a lock is available that will permit appropriate update of the business object corresponding to the task. In one embodiment, by attempting to acquire the lock initially rather than immediately queuing the confirmation, the overhead of the queuing system is reduced. If it is, the database is updated at block 206 and acknowledge the successful update is sent to the remote source of the confirmation at block 208. If it is not possible to acquire a lock at block 204, the confirmation is queued at block 210. Then, notwithstanding that the database update has not yet occurred a successful acknowledgement is sent to the source of the confirmation at block 212. Then at block 214, the system waits a defined time period after which will retry to acquire a lock to update the business object responsive to the confirmation. Some embodiments may immediately retry, however, because the item is often still locked, it has been found in some system to increase system load without a corresponding benefit.

At block 216, a determination is made if the retry for lock acquisition was successful. If it was not, the system returns to wait an additional period. As previously noted, this wait period may be configured and need not be the same between each subsequent retry. If the retry is successful, the database is updated at block 218. After the successful update at block 218 or after the acknowledgement of successful update at block 208, a lock is released at block 220.

By employing a data model which permits high granularity locking, such as locking on an item basis and by further requiring independence of the item data from global data, the instance of lock collision can be reduced. By queuing confirmations when lock collisions occur, and preacknowledging successful updates impact of lock collisions on remote users can be mitigated or eliminated.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions.

In the foregoing specification, the invention has been described with reference to the specific embodiments thereof.

It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving, from a signal source, a confirmation of completion of a task for a central object, the central object including item data and global data, the global data independent of the item data;
   attempting to acquire a database lock for a subset of the item data of the central object; and
   acknowledging to the signaling source a successful update regardless of a success in acquiring the lock.

2. A system comprising:
   a database to persistently storing a central object corresponding to a business process, the central object based on a data model having global data independent from item data;
   a lock server coupled to the database to provide database locks for individual item data;
   an update module to update an item in the central object responsive to a confirmation from a remote source, the update module to signal the remote source success of the update before the update occurs if a lock for the item cannot be acquired within a defined time period after receipt of the confirmation.

3. The system of claim 2 comprising:
   a wireless interface to receive the confirmation from the remote source.

4. The system of claim 2 wherein the remote source comprises one of:
   a radio frequency identification (RFID) scanner and a bar code scanner.

5. The system of claim 2 wherein the update module comprises:
   a retry timer; and
   a retry module, the retry module responsive to the timer to cause the update module to attempt to acquire a lock for the item.

6. A non-transitory machine-accessible medium containing instructions that when executed cause a machine to:
   receive, from a signal source, a confirmation of completion of a task for a central object the central object including item data and global data independent of the item data;
   attempt to acquire a database lock for a subset of the item data of the central object; and
   acknowledge to the signaling source a successful update regardless of a success in acquiring the lock.

7. An apparatus comprising:
   means for persistently storing objects having global data and item data, the global data independent of We item data;
   means for acquiring a lock for an item data independent of other item data in an object; and
   means for updating the object that acknowledges a successful update to a sender of a con fixation within a defined time period even though the update has not completed.

8. The apparatus of claim 7 further comprising:
   means for receiving a confirmation from a remote source; and
   means for retrying lock acquisition if a prior attempt to acquire the lock was unsuccessful.

* * * * *